(12) United States Patent
Carlay, II et al.

(10) Patent No.: US 9,366,366 B2
(45) Date of Patent: Jun. 14, 2016

(54) FLEXIBLE HVAC DUCT AND METHOD OF USE

(71) Applicants: Ronald L. Carlay, II, Cookeville, TN (US); Donald Bradley Campbell, Anderson, SC (US)

(72) Inventors: Ronald L. Carlay, II, Cookeville, TN (US); Donald Bradley Campbell, Anderson, SC (US)

(73) Assignee: Flexible Technologies, Inc., Abbeville, SC (US)

( * ) Notice: Subject to any disclaimer, the term of this patent is extended or adjusted under 35 U.S.C. 154(b) by 604 days.

(21) Appl. No.: 13/661,223

(22) Filed: Oct. 26, 2012

(65) Prior Publication Data

US 2013/0047401 A1 Feb. 28, 2013

Related U.S. Application Data

(62) Division of application No. 12/320,304, filed on Jan. 23, 2009, now abandoned.

(51) Int. Cl.
*F16L 11/00* (2006.01)
*F16L 11/04* (2006.01)
*F16L 11/08* (2006.01)
*F24F 13/02* (2006.01)

(52) U.S. Cl.
CPC ............ *F16L 11/045* (2013.01); *F16L 11/081* (2013.01); *F24F 13/0218* (2013.01); *F16L 2011/047* (2013.01); *Y10T 29/49822* (2015.01); *Y10T 29/53* (2015.01)

(58) Field of Classification Search
CPC ................ B23B 2037/14; B60H 2001/00607; F16L 11/045; F16L 11/08; F16L 11/081; F16L 11/083; F16L 2011/047; Y10T 29/49822; Y10T 29/53; F24F 13/0218
USPC ................................ 128/149, 125, 129, 132
See application file for complete search history.

(56) References Cited

U.S. PATENT DOCUMENTS

| 4,101,700 A | * | 7/1978 | Ray, Jr. ............... C08K 3/28 |
| | | | 138/DIG. 2 |
| 4,410,014 A | | 10/1983 | Smith |
| 4,990,143 A | | 2/1991 | Sheridan |
| 5,314,212 A | | 5/1994 | Sanders |

(Continued)

FOREIGN PATENT DOCUMENTS

| EP | 1870629 | 12/2007 | |
| GR | EP 1870629 A2 * | 12/2007 | ............ F16L 11/081 |

(Continued)

OTHER PUBLICATIONS

National Study Plastic Recyling Sector—Jan. 2008 pp. 1-28, Plastic Technology Center (PTC)—"To reach a development strategy & action plan on how to upgrade the Egyptian Plastic Recycling Sector to face its future challenges and attract Foreign Direct Investment".*

*Primary Examiner* — Jason L Vaughan
(74) *Attorney, Agent, or Firm* — Clark & Brody

(57) ABSTRACT

A flexible HVAC duct is made with a support structure-containing duct liner, insulation layer, and reinforcing layer-containing vapor barrier. At least the duct liner and vapor barrier are constructed of polymer materials that enable them to be placed in the same recycling stream once the flexible HVAC duct is removed from its installed location. The insulation layer can also be made of a polymer material compatible with that used for the duct liner and vapor barrier so that the entire duct can be recycled once removed.

7 Claims, 2 Drawing Sheets

(56) References Cited

U.S. PATENT DOCUMENTS

| | | |
|---|---|---|
| 5,400,602 A | 3/1995 | Chang et al. |
| 5,526,849 A | 6/1996 | Gray |
| 5,582,905 A | 12/1996 | Beck et al. |
| 5,607,529 A | 3/1997 | Adamczyk et al. |
| 5,785,091 A | 7/1998 | Baker, II |
| 5,795,634 A * | 8/1998 | Fukui ................. B32B 1/08 138/122 |
| 5,947,158 A | 9/1999 | Gross et al. |
| 6,158,477 A | 12/2000 | Waters |
| 6,186,183 B1 | 2/2001 | Lepoutre |
| 6,386,316 B1 | 5/2002 | Lepoutre |
| 6,425,419 B1 | 7/2002 | Attra |
| 7,749,923 B2 | 7/2010 | Moore et al. |
| 8,469,062 B2 * | 6/2013 | Liebson et al. ............. 138/133 |
| 2003/0075228 A1 * | 4/2003 | Tippett ........................ 138/125 |
| 2003/0232207 A1 | 12/2003 | Thullen et al. |
| 2004/0213935 A1 * | 10/2004 | Dehennau et al. ......... 428/36.91 |
| 2005/0092384 A1 | 5/2005 | Curb et al. |
| 2007/0131299 A1 | 6/2007 | Kornbleet |
| 2009/0133347 A1 | 5/2009 | Wadsworth |
| 2010/0154914 A1 | 6/2010 | Liebson et al. |
| 2010/0229997 A1 | 9/2010 | Moore et al. |

FOREIGN PATENT DOCUMENTS

| | | |
|---|---|---|
| JP | 2000-304169 | 11/2000 |
| JP | 2001-027370 | 1/2001 |
| JP | 2005-098371 | 4/2005 |

* cited by examiner

FLEXIBLE HVAC DUCT AND METHOD OF USE

This application is a Divisional of U.S. Ser. No. 12/320,304 filed on Jan. 23, 2009.

FIELD OF THE INVENTION

The present invention is directed to a flexible heating, ventilating, and air conditioning (HVAC) duct and a method for use, and in particular, to a duct that has several or all of its components made in a particular way so that the components can be recycled once the duct is removed from its installed location due to demolition or renovation.

BACKGROUND ART

The construction of factory-made flexible HVAC ducts is well known in the industry. These types of ducts usually comprise a helical-supported duct liner (sometimes referred to as the core or inner core) covered by a layer of fiberglass insulation, which is, in turn, covered by a scrim-reinforced vapor barrier. Scrim is a woven material that adds strength to a laminate construction when made a part thereof. U.S. Pat. Nos. 6,158,477 and 5,785,091 show typical constructions of factory made ducts. U.S. Pat. No. 5,785,091 teaches that the duct liner and vapor barrier can be manufactured from polymer tapes, particularly polyester. U.S. Pat. No. 5,526,849 discloses a plastic helix in combination with a metal helix and U.S. Pat. No. 4,990,143 discloses a polyester helix. United States Patent Publication No. 2007/0131299 discloses a polyester scrim used in a vapor barrier.

In the prior art, factory-made flexible HVAC ducts are typically constructed of three main components; a duct liner for conveying air, a layer of insulation for preventing energy loss through the duct wall, and a vapor barrier for holding the fiberglass around the liner while protecting the fiberglass from moisture. The duct liner is commonly constructed of a steel wire sandwiched between layers of polyester (PET) film. Other plastics and coated fabrics are also used to construct the wall of the duct liner.

In the prior art, a plastic helix is sometimes used in conjunction with a steel helix to support the duct liner. In some cases, a narrow metal strip is crimped around the material forming the wall of the duct liner. The strip holds the material together and provides support.

Flexible tubing constructed of homogeneous materials is also common. These types of tubing have a similar support structure to that of a flexible duct liner with a spiral helix connected to a tube wall. These products are not known to be used as HVAC duct liners.

Flexible HVAC duct liners are composed of a mixture of materials, typically metals, plastics and/or fiberglass. The insulation is typically a batt of low-density fiberglass wrapped around the inner core. In some cases, other various textile scrap fiber is used to make the insulation batts. The insulation is held around the duct liner by the vapor barrier.

The vapor barrier is commonly constructed of either a tubular extruded polyethylene film or a fiberglass rip-stop, usually scrim, sandwiched between layers of polyester film. In the case of polyester films, the outer layer of film is typically a metallic-coated polyester film while the inner film is clear uncoated polyester film. In the prior art, a polyester scrim may be substituted for fiberglass scrim.

FIG. 1 shows an example of a prior art HVAC duct 10 that includes a duct liner 1, insulation layer 3, and vapor barrier 5. The duct liner comprises a polymer layer 7 surrounded by a metal helix 9. Although not shown, the vapor barrier is made up an inner clear polyester layer, a fiberglass scrim, and an outer metallized polyester layer.

Factory-made flexible HVAC ducts are aggregates of a number of materials. Ducts that contain a particular material or set of materials in the duct liner have different materials or sets of materials in the vapor barrier. This is a result of material selection based on cost and performance of the materials in meeting the test criteria of safety agencies (such as UL, ETL, etc.).

Mixed materials used in the duct liner and the vapor barrier of factory-made flexible HVAC ducts prohibit the recycling of any of the otherwise recyclable materials without separating the materials first. In cases where the duct liner or the vapor barrier were of a homogeneous material, they would not be compatible with the materials used in the other components and could not be recycled together in a common recycling stream. For example, extruded polyethylene vapor barrier is homogeneous, but it is not recyclable with materials used in the duct liner of factory-made flexible HVAC ducts. Factory-made flexible air ducts with polyester film vapor barrier are all fiberglass-scrim reinforced. The fiberglass scrim is not compatible for recycling with the polyester. The metallic-coated film used in most vapor barrier is not compatible for recycling with either the polyester film or the fiberglass scrim.

Another difficulty in this area is that factory-made flexible HVAC ducts are required to meet certain safety/performance criteria as defined by safety agencies and code bodies with jurisdiction where the products are being used. These criteria make the use of certain materials (especially plastics) extremely difficult for structural elements of the ducts. Manufacturing process and product design changes are necessary to overcome issues that otherwise prohibit conformance with safety/performance criteria.

The vapor barrier, insulation, and duct liner of a factory-made flexible HVAC duct can be easily separated from each other. The fiberglass insulation is recyclable once removed. However, it is not economically feasible to separate the components comprising the vapor barrier or the duct liner. It is cheaper to pay for landfill disposal than to separate the materials of these duct components. Therefore, it is normal industry practice to landfill all used or damaged HVAC ducts or sections of duct without recycling them. The environmental impact is substantial. It is estimate that approximately 140 million feet of insulated flexible HVAC duct is replaced (through demolition and/or renovation) each year in North America alone. The scrap duct also causes problems at landfills as the steel wire helices become entangled in equipment and often cause damage to the equipment.

Another environmental problem with these prior art ducts relates to the use of metal helices in the duct liner. The steel wire is the heaviest material in the duct and makes up more than half the weight of the duct. This requires more fuel for distribution than a lighter weight material would require. Also, the steel helices are often permanently deformed during the packaging of the ducts. This prohibits smaller packages from being used, which would also reduce the energy required for distribution. Once deformed, the steel helices can restrict airflow within the duct once it is installed, leading to further energy loss in the HVAC system.

When factory-made flexible HVAC ducts are cut either during manufacture or during installation, the cut ends of the steel helices have sharp ends responsible for puncture wounds and cuts to those manufacturing, installing and removing flexible ducts. The steel helices are cold-worked during the manufacturing process causing the material to "spring back"

(recover) when the helices are cut during manufacturing, installation and removal. This effect often leads to a wound as the sharp points of the steel helices are propelled towards the hands or arms that are holding or supporting the ducts.

In the prior art, there are no flexible duct helices that are capable of recovering from deformation that would allow for potentially smaller packages and better airflow in HVAC systems.

In light of the problems with state of the art HVAC ducts, a need exists to provide improved duct designs in order to make the ducts more amenable to recycling rather than disposal in a landfill or the like. However, no factory-made flexible HVAC duct is offered with a duct liner of homogeneous material. In addition, no factory-made flexible HVAC duct with a duct liner and vapor barrier comprised of recyclable materials that would prevent the widespread landfill dumping of flexible duct scrap by allowing two or three separate compatible recycle streams is known in the prior art. Further, no factory-made flexible HVAC duct with a duct liner, vapor barrier, and insulation comprised of recyclable materials that would prevent the widespread landfill dumping of flexible duct scrap by allowing one compatible recycle stream is known in the prior art In response to this need, the present invention provides an HVAC duct that overcome the problems in recycling and injury associated with the prior art duct liners. The HVAC duct of the invention has at least its duct liner and vapor barrier construction made from polymer materials that enable these two components to be recycled, thus avoiding the landfill and disposal problems of prior art duct liner. In a further embodiment, the invention provides for a flexible HVAC duct liner that is entirely recyclable. The duct liner also employs a polymer support structure that does not pose the problems associated with the metal helices of prior art ducts.

SUMMARY OF THE INVENTION

It is a first object of the invention to provide an improved flexible HVAC duct that is more amenable to recycling once removed from its place of installation.

It is another object of the invention to provide a flexible HVAC duct that is totally recyclable.

A further object of the invention is a method of removing the inventive flexible HVAC duct and creating a recyclable load to be placed in a recycling stream.

Another object of the invention is a method of installing the flexible HVAC duct in a structure so that when the structure is renovated or demolished, the installed flexible HVAC duct can be recycled rather than disposed of in a landfill or the like.

Other objects and advantages will become apparent as a description of the invention proceeds.

In satisfaction of the foregoing objects and advantages of the invention, the invention is an improvement in flexible HVAC ducts that have a duct liner, an insulation layer surrounding the duct liner, and a vapor barrier surrounding the insulation layer. The duct liner of the inventive duct has a first polymer layer, a second polymer support structure, and means for connecting the first polymer layer and the second polymer support structure together so as to form a generally cylindrical configuration. The vapor barrier of the inventive duct further comprises a third polymer layer, a fourth polymer reinforcing layer, and a means for connecting the two together similar to the connection used for the duct liner. The polymers used in the duct liner and the polymers used in the vapor barrier are the same or similar in nature so that the duct liner and vapor barrier can be recycled together once the flexible HVAC duct is removed from an installed location.

In another embodiment, the insulation can be made of a polymer material that is the same or similar to that used in the duct liner and vapor barrier so that the entire duct can be recycled. Preferably, the polymer used in the duct liner and the vapor barrier is one of polyester, such as polyethylene terephthalate, polyethylene, including chlorinated polyethylenes, polypropylene, and polyvinyl chloride. Likewise, the insulation, when matching the duct liner and vapor barrier can be made of the same polymer materials.

While the support structure of the duct liner can take on a variety of shapes, a helical shape is preferred. The polymer layer and a polymer support structure of the duct liner can be connected together using an adhesive or other bonding technique. Alternatively, the connecting means can include the use of an additional polymer layer so that the polymer support structure is disposed between two polymer layers that are attached to each other and the support structure. The vapor barrier can also use a similar construction as duct liner, whereby an additional polymer layer is used to sandwich the reinforcing layer between the two layers or an adhesive or the like is used to adhere the reinforcing layer to the single polymer layer.

The invention is also an improvement in a method of recycling flexible HVAC ducts. In one mode, once the inventive duct has been installed in a structure, and the duct, because of the need for renovation, demolition or the like, is removed from the structure and the insulation is separated from the duct liner and vapor barrier. The duct liner and vapor barrier form a load that can be recycled rather than disposed of in a landfill or the like. Another mode relates to the inventive duct when the insulation layer matches the duct liner and vapor barrier material from an ability-to-recycle standpoint. In this mode, once the duct is removed, the entire duct forms the recyclable load.

The inventive flexible HVAC duct can be used in any structure where heating, ventilation and/or air conditioning is need and is advantageous since the duct can be later recycled once the duct is either replaced or the structure containing the duct must be demolished.

BRIEF DESCRIPTION OF THE DRAWINGS

Reference is now made to the drawings of the invention wherein.

DESCRIPTION OF THE PREFERRED EMBODIMENTS

Figure 1:
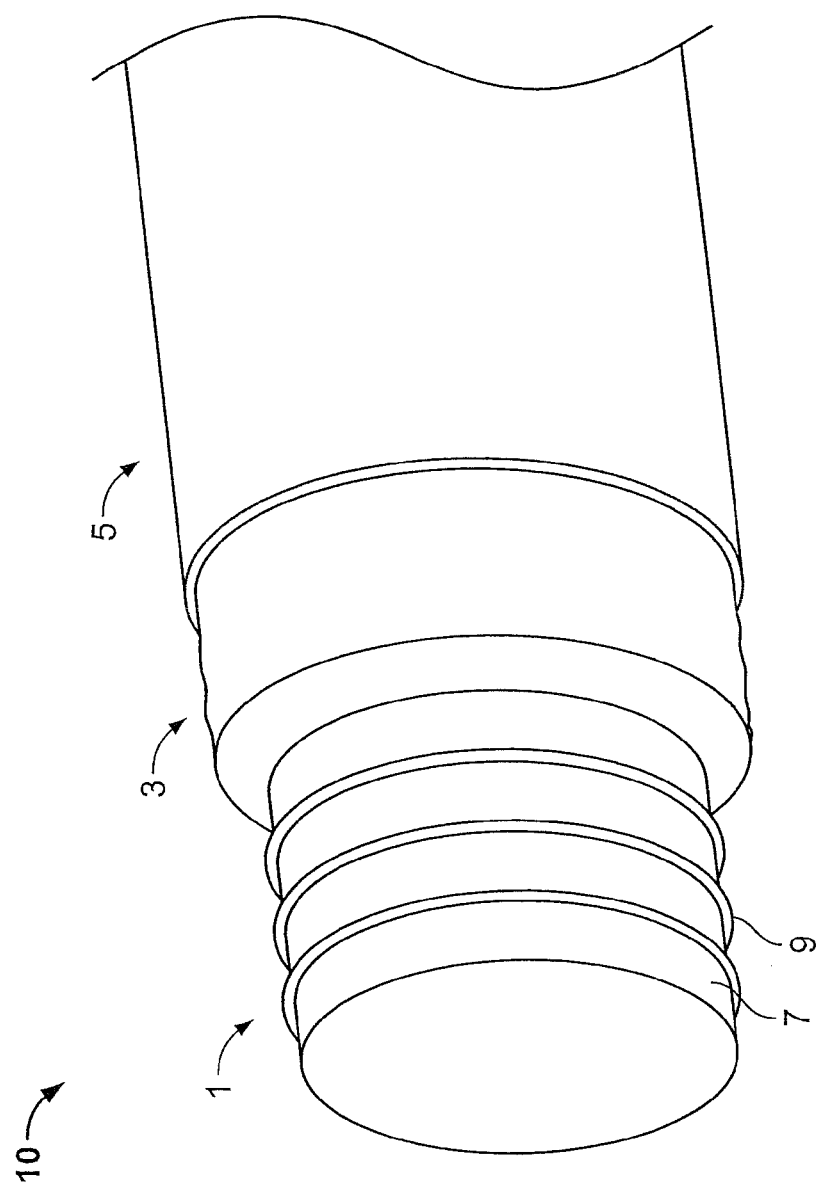
FIG. 1 is a schematic perspective view of a prior art flexible HVAC duct.

The invention offers significant advantages in the field of flexible HVAC ducts and the ability to use the components of the duct in recycling streams rather than dispose of the ducts after demolition and/or renovation.

More particularly and in one mode, the invention is a factory-made flexible HVAC duct designed to be lighter than existing duct and more easily recyclable. In one mode, the duct has a duct liner and vapor barrier separated by insulation, whereby the duct liner is made of a polymer (preferably polyethylene terephthalate) and includes a polymer (preferably polyethylene terephthalate) support structure, e.g., a helical coil or other).

The vapor barrier is similar in construction with a polymer layer or wall and a polymer reinforcing layer or scrim (both preferably a polyester such as polyethylene terephthalate). The polymer support structure is treated during the manufacturing process in such way (described below) as to insure its usefulness as a duct component capable of meeting applicable safety/performance criteria.

The duct can also incorporate a flame retardant additive as are known in the prior art. The flame retardant additive could be incorporated into one or more of the different components of the duct in any number of known ways. For example, a flame retardant composition could be sprayed or otherwise applied onto the second polymer support structure during the manufacture. Alternatively, the flame retardant composition could be incorporated into one or more of the polymer layers.

The vapor barrier made up of the polymer layer and the polymer reinforcing layer contains only non-metallic components. As an alternate to enhance properties beyond today's requirements, the polymer reinforcing layer or scrim may be treated in such a way as make it resistant to fire.

When the ducting is removed from a structure that is being demolished or renovated, or when the HVAC system is being replaced, the components of the ducting can be easily and economically recycled as described in more detail below.

In another mode of the invention, the insulation may also be composed of a polymer that is the same or similar to the duct liner and vapor barrier and, thereby, the insulation could be recycled along with those components in a common recycling stream. When using fiberglass insulation, the insulation would be removed and the duct liner and vapor barrier would be easily recyclable in a common recycling stream to create a two product recycled load. The fiberglass insulation is also recyclable once separated from the other components.

Another advantage of the invention is through the use of the polymer duct liner support structure. This structure will recover from temporary deformation caused by packaging of factory-made flexible HVAC ducts. This trait, in turn, will allow for use of more compact packaging for the flexible HVAC ducts, which will, in turn, reduce energy for distributing them.

The polymer duct support structure will also reduce the likelihood of puncture wounds and cuts to those handling the ducts that normally occur when metal support structures are used. The polymer material of the support structure is not cold-worked or otherwise treated to induce "memory". Therefore, when cut during manufacturing, installation or removal, the plastic support structure has less potential to cause an injury than a metal helix. Also, the softness of the plastic support structure and the larger diameters of the materials comprising the plastic support structure make it less likely to produce puncture wounds than a metal wire helix.

Figure 2:
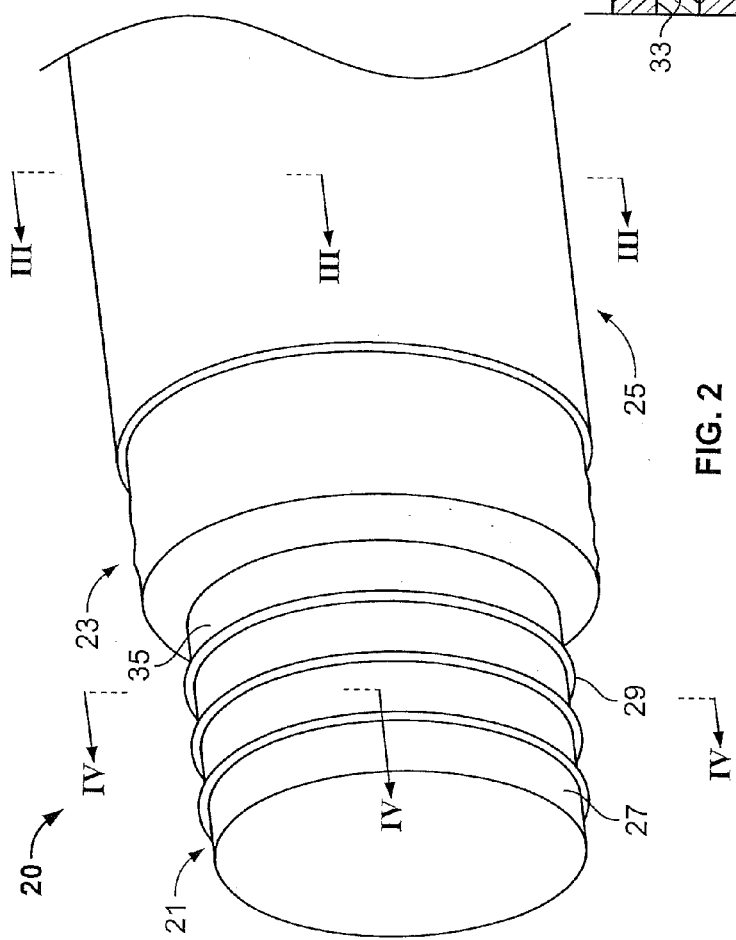
FIG. 2 is a schematic perspective view of flexible HVAC duct according to one embodiment of the invention.

FIG. 2 shows a more detailed view of one embodiment of the invention. The flexible HVAC duct according to the invention is designated by the reference numeral 20 and includes a duct liner 21, insulation layer 23, and vapor barrier 25. The duct liner 21 further comprises a first polymer layer 27 that is surrounded by a second polymer support structure 29. The support structure 29 is shown as a helix, but other shapes as would be known in the art could be employed. The second polymer support structure 29 is adhered to the first polymer layer 27 using a means for connecting the two layers together. This connecting means could be either a bonding technique such as the use of an adhesive or some other bonding method or the use of an additional polymer layer, which would be adhered to the layer 27 and support structure 29 to form the duct liner. In the latter embodiment, the second polymer support structure 29 is sandwiched between the first polymer layer 27 and another layer during the manufacturing process.

The insulation layer 23 can be any type of insulation such as the fiberglass batt insulation that is used in the prior art or a polymer insulation, e.g., a polyester fiber batt, that is compatible with the polymers used in the duct liner 21 and vapor barrier 25. Using a compatible polymer for the insulation layer means that the entire duct 20 can be recycled. Using an incompatible material such as a fiberglass insulation would mean that the layer 23 would have to be separated from duct liner 21 and vapor barrier 25 before these two latter components could form a recyclable load and be put into a recycle stream.

Figure 3:
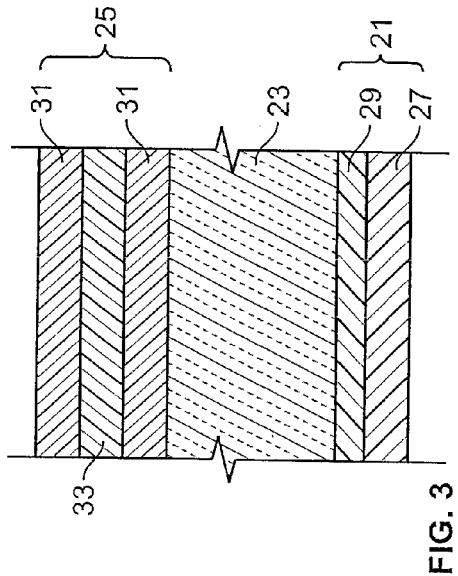
FIG. 3 is a sectional view of a portion of the vapor barrier of the duct of FIG. 2.

FIG. 3 shows a schematic construction of the duct 20 in more detail along the line of FIG. 1. The vapor barrier 25 comprises a pair of polymer layers 31 with a polymer reinforcing layer 33 situated in between the layers 27. The polymer reinforcing layer 33 can be polymer scrim material to act as a rip stop for the vapor barrier. The preferred polymer for the vapor barrier is a polyester, e.g., polyethylene terephthalate, both as the inner and outer layers 31 and the reinforcing layer 33. In this mode, one of the layers acts as a means for connecting the reinforcing layer 33 to the other layer. Another mode of attachment between the reinforcing layer 33 and the adjacent layer 31 would be to employ an adhesive or other bonding technique to keep the reinforcing layer in association with a single layer 31, with the reinforcing layer acting as the exterior of the duct or adjacent the insulation 23. It is preferred that the inner and outer layers are not metallized polyester layers as are commonly employed in the prior art since these metallized materials wreak havoc in a recycling stream. Typically, the layers 31 are just clear, but they could also be made translucent or with any color if so desired.

FIG. 3 also shows the insulation layer 23 disposed between one of the layers 31 of the vapor barrier and the duct liner 21. The duct liner is also shown in FIG. 3, with a polymer helix as the polymer support structure 29 and the polymer layer 27. Although not shown, an adhesive holds the polymer support structure 29 to the polymer layer 27 as a connecting means. Of course, other bonding methods could be employed to keep the polymer layer 27 in association with the polymer support structure 29.

Figure 4:
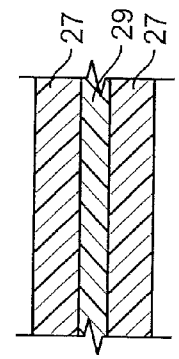
FIG. 4 is a sectional view of a portion of the duct liner of another embodiment of the invention.

While the duct liner 21 is shown with the polymer support structure 29 attached to an outer surface 37 of the layer 27, it is possible to sandwich the polymer support structure 29 between two polymer layers as shown in FIG. 4. FIG. 4 is a modified version of the duct liner of FIG. 1, and employs a pair of polymer layers 27 attached together, with the polymer support structure 29 between the two layers 27. The sectional view of modified duct liner of FIG. 4 is represented by the lines IV-IV of FIG. 1. Here, the second of the two layers 27 being adhered to the other layer 27 and support structure 29 acts as a means for connecting the polymer support structure to a single layer 27.

In use, the duct 20 can be installed in new construction or replace existing ductwork in existing structures. Once the duct 20 is in place, it is much more easily recycled than the prior air ducts. That is, the duct 20 is removed from the structure and either the entire duct is put into a recycle stream for the polymer or mix of polymers making up the duct construction or the insulation is removed from the duct and the remaining duct liner and vapor barrier are recycled. The removed insulation could be separately recycled, if desired.

While polyester, preferably polyethylene terephthalate, is shown as one example of a polymer material that could be used to make the duct liner layer and support structure, insulation, and vapor barrier, other polymers, such as polyethylene, a chlorinated polyethylene, polypropylene, polyvinyl chloride, other types of polyesters than polyethylene terephthalate, could be used as well. In addition, the polymers do not have to be all the same to achieve the recycling aim of the invention. For instance, different densities of polyethylene or polyethylene and chlorinated polyethylene could be used be used in the same recycling stream could be employed to make the various components of the duct work. For example, a polyethylene and polyester could be used together with the understanding that the plastics recycler has the capability to separate the two components during the recycling process.

The duct 20 of the invention is made using normal manufacturing processes to make these types of duct so that a detailed explanation of the manufacturing process is not necessary for understanding of the invention.

While the duct is shown with preferred materials and laminated construction, any type of a duct liner that would include a layer establishing an inner surface for flow through the duct and a support structure can be used providing that the materials are at least compatible with the vapor barrier for recycling purposes. Likewise, the vapor barrier can have any known construction providing that a reinforcing layer is present and that the materials of construction of the vapor barrier are compatible with the duct liner for recycling purposes. If desired, the insulation disposed between the duct liner and vapor barrier can match the recyclable nature of the duct liner and vapor barrier so that the entire duct can be recycled and the insulation does not have to be separated from the duct liner or vapor barrier.

As such, an invention has been disclosed in terms of preferred embodiments thereof which fulfills each and every one of the objects of the present invention as set forth above and provides a new and improved flexible HVAC duct and method of use.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A method of recycling a flexible HVAC duct comprising a duct liner, a layer of insulation surrounding the duct liner, and a vapor barrier surrounding the layer of insulation, the layer of insulation being a fiberglass batt insulation, wherein the flexible HVAC duct further comprises:
   a) the duct liner further comprising a first polymer layer, a second polymer support structure, and means for connecting the first polymer layer and the second polymer support structure together so as to form a generally cylindrical configuration; and
   b) the vapor barrier further comprising a third polymer layer, a fourth polymer reinforcing layer, and means for connecting the third polymer layer and the fourth polymer reinforcing layer together;
   c) wherein the polymers used in the duct liner and the polymers used in the vapor barrier are selected from the group consisting of polypropylene, polyethylene, polyester, polyvinyl chloride, and a chlorinated polyethylene; the method comprising:
   i) removing the duct from a structure; and
   ii) separating the duct liner and vapor barrier from the fiberglass batt insulation to form a recyclable load as the vapor barrier and the duct liner.

2. The method of claim 1, wherein the second polymer support structure of the duct includes a flame retardant additive.

3. The method of claim 1, wherein the second polymer support structure of the duct is helical in shape.

4. The duct of claim 1, wherein the means for connecting the first polymer layer and the second polymer support structure comprises an adhesive or a fifth polymer layer, with the second polymer support structure disposed between the first polymer layer and the fifth polymer layer.

5. The method of claim 1, wherein the means for connecting the third polymer layer and the fourth polymer reinforcing layer comprises an adhesive or a sixth polymer layer, with the fourth polymer reinforcing layer disposed between the third polymer layer and the sixth polymer layer.

6. In a method of supplying a gas to a location in a structure using a flexible HVAC duct, the improvement comprising using a flexible HVAC duct comprising a duct liner, a layer of insulation surrounding the duct liner, and a vapor barrier surrounding the layer of insulation, the layer of insulation being a fiberglass batt insulation, wherein the flexible HVAC duct further comprises:
   a) the duct liner further comprising a first polymer layer, a second polymer support structure, and means for connecting the first polymer layer and the second polymer support structure together so as to form a generally cylindrical configuration; and
   b) the vapor barrier further comprising a third polymer layer, a fourth polymer reinforcing layer, and means for connecting the third polymer layer and the fourth polymer reinforcing layer together;
   c) wherein the polymers used in the duct liner and the polymers used in the vapor barrier are selected from the group consisting of polypropylene, polyethylene, polyester, polyvinyl chloride, and a chlorinated polyethylene.

7. The method of claim 6, wherein the gas is heated or cooled or conditioned air.

* * * * *